US006640353B1

(12) United States Patent
Williams

(10) Patent No.: US 6,640,353 B1
(45) Date of Patent: Nov. 4, 2003

(54) SOLAR POOL HEATING SYSTEM

(76) Inventor: James F. Williams, 12720 Wilkes Way, Lakewood, CA (US) 90715

( * ) Notice: Subject to any disclaimer, the term of this patent is extended or adjusted under 35 U.S.C. 154(b) by 0 days.

(21) Appl. No.: 10/076,473

(22) Filed: Feb. 15, 2002

(51) Int. Cl.$^7$ ................................................ E04H 4/06
(52) U.S. Cl. .............................................. 4/493; 4/498
(58) Field of Search ........................... 4/493, 498, 499; 126/565, 566

(56) References Cited

U.S. PATENT DOCUMENTS

| 3,893,443 A | | 7/1975 | Smith ........................... 126/565 |
| 3,940,809 A | * | 3/1976 | Hughes ........................... 4/499 |
| 3,949,095 A | | 4/1976 | Pelehach et al. ............. 126/565 |
| 3,984,882 A | | 10/1976 | Forman et al. .............. 4/493 X |
| 4,000,527 A | * | 1/1977 | Gannon ........................... 4/499 |
| 4,022,187 A | | 5/1977 | Roberts ....................... 4/493 X |
| D258,463 S | | 3/1981 | Emmer ........................... D25/2 |
| 4,270,232 A | | 6/1981 | Ballew ........................... 4/498 |
| 4,458,668 A | | 7/1984 | Sheldon ..................... 4/498 X |
| 5,970,530 A | * | 10/1999 | Hansen et al. ................. 4/498 |

FOREIGN PATENT DOCUMENTS

| DE | 2132213 | * | 1/1973 | .................... 4/498 |

* cited by examiner

Primary Examiner—Robert M. Fetsuga

(57) ABSTRACT

A solar pool heating system for providing a foldable floating frame and heat absorbent cover to permit selective heating of a pool of water. The solar pool heating system includes a floating frame and a cover member of heat absorent material. The frame positions the cover in spaced relationship to a surface of the water in a pool to permit heating of the pool as solar energy is absorbed by the cover. The frame assembly is foldable in half and the cover member is used as a way of carrying and storing the frame assembly in the folded position. In an embodiment, handles are provided on the cover member to facilitate handling and storage of the device.

2 Claims, 1 Drawing Sheet

SOLAR POOL HEATING SYSTEM

BACKGROUND OF THE INVENTION

1. Field of the Invention

The present invention relates to solar pool heaters and more particularly pertains to a new solar pool heating system for providing a foldable floating frame and heat absorbent cover to permit selective heating of a pool of water.

2. Description of the Prior Art

The use of solar pool heaters is known in the prior art. U.S. Pat. No. 4,022,187 describes a pool heater system having a pair of spaced panels, one transparent and one opaque. Typically, the lower panel is a single sheet and multiple separate upper panels are provided to form spaced cells. Another type of solar pool heater is U.S. Pat. No. 4,270,232 also having a plurality of small cells having spaced panels of material forming an insulating chamber. U.S. Pat. No. 3,893,443 similarly teaches a pair of spaced surfaces forming an insulating chamber. U.S. Pat. No. 3,949,095 again teaches the use of two spaced materials, one being heat transmitting and one for absorbing heat. U.S. Pat. No. 3,984,882 teaches a frame and a woven sheet having a plurality of interstices. U.S. Pat. No. 4,458,668 teaches a kit to form a panel assembly to be deployed on water. U.S. Pat. No. Des. 258,463 teaches an ornamental design for a pool cover having chambers to transmit heat.

While these devices fulfill their respective, particular objectives and requirements, the need remains for a system that combines function with portability.

SUMMARY OF THE INVENTION

The present invention meets the needs presented above by providing a frame sized to be efficient yet easily handled by a single user. Further, the present invention has a foldable medial section to facilitate storage and handling without requiring extensive disassembly of the device.

Still yet another object of the present invention is to provide a new solar pool heating system that can use a single assembly or multiple assemblies to cover an adjustable amount of water surface.

Even still another object of the present invention is to provide a new solar pool heating system that includes an embodiment providing unique loop members to facilitate removal from a pool, coupling of multiple assemblies together during use, and transport of the frame and cover.

To this end, the present invention generally comprises a floating frame and a cover member of heat absorbent material. The frame positions the cover in spaced relationship to a surface of the water in a pool to permit heating of the pool as solar energy is absorbed by the cover.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
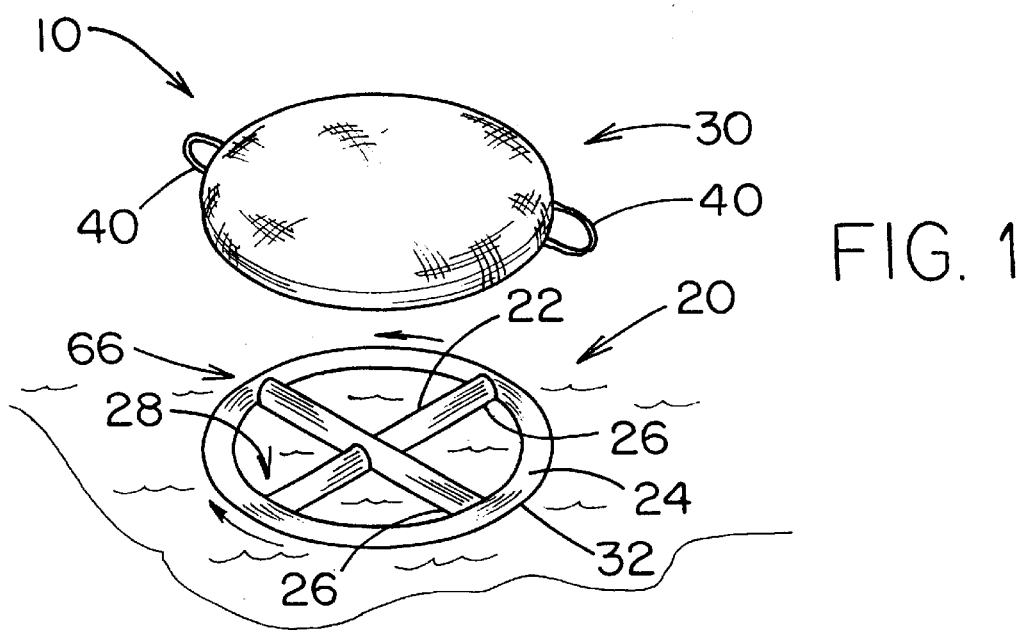
FIG. 1 is a perspective view of a new solar pool heating system according to the present invention.
Figure 2:
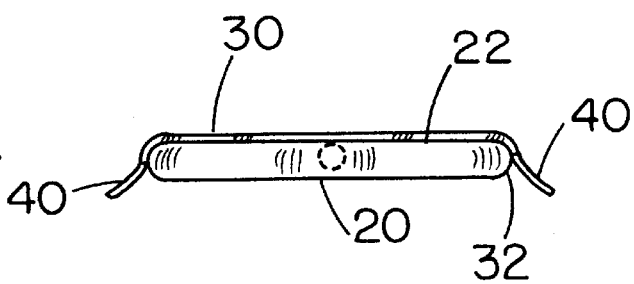
FIG. 2 is a side view of the present invention.
Figure 3:
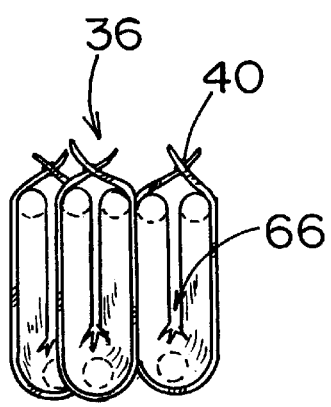
FIG. 3 is a side view of multiple assemblies of the present invention in a storage position.

With reference now to the drawings, and in particular to FIGS. 1 through 3 thereof, a new solar pool heating system embodying the principles and concepts of the present invention and generally designated by the reference numeral 10 will be described.

As best illustrated in FIGS. 1 through 3, the solar pool heating system 10 generally comprises a buoyant plastic frame assembly 20 designed to float on a water surface of a pool. A cover member 30 is couplable to the frame assembly 20 to extend along a top 22 of the frame assembly in spaced relationship to the water surface. The cover member is constructed of a heat absorbent material such as dark vinyl for enhancing heat transfer to the pool.

The frame assembly includes an outer perimeter 24 and a pair of cross members 26 extending through a central opening 28 of the outer perimeter 24 for supporting the cover member 30.

A medial portion 66 of the frame assembly 20 is flexible to permit folding of the frame assembly 20 along a substantially straight line to facilitate storage and transport of the frame assembly 20. The cover member 30 may be positioned to extend around the frame assembly 20 when the frame assembly 20 is in a folded position so that the cover member 30 substantially envelopes the frame assembly 20. Typically, the folding may be achieved through such methods as jointing of the folding areas, accordion style folding regions on the outer perimeter and on either side of one of the cross members, or use of a flexible material such as rubber in appropriate areas.

A pair of loop members 40 extend from the cover member 30 for providing handles to facilitate manipulation of the frame assembly 20 when the cover member 30 is coupled to the frame assembly 20. The loop members 40 are positioned symmetrically with respect to an axis passing through a center of the cover member 30. The loop members 40 are further positioned proximate an outer edge 32 of the cover member 30. Thus, the loop members are engageable to each other by slipping one loop member through the other to form a single handle 36 when the frame assembly is folded.

In a most preferred embodiment, the frame assembly 20 has an annular outer perimeter and a diameter of the outer perimeter is about 5 feet to maximize heating area while maintaining an easily handled size.

In use, the cover member is positioned over the frame and the frame is floated in a pool. The cover member is held in space relationship to the water surface of the pool and the outer perimeter of the frame assembly engages the water surface to form an insulative chamber. The heat absorbing qualities of the cover member increase the heat level of the insulative chamber formed by the cover member, frame assembly and water surface and the heat is absorbed into the pool of water to heat the pool. The frame assembly can be folded and the handle members tied together or one slipped through the other to permit easy carrying of the device.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A solar pool heating system comprising:

a buoyant frame assembly adapted to float on a water surface of a pool;

a cover member couplable to said frame assembly to extend along a top of said frame assembly in spaced relationship to the water surface, said cover member being constructed of a heat absorbent material for enhancing heat transfer to said pool;

a medial portion of said frame assembly being flexible to permit folding of said frame assembly along a substantially straight line to facilitate storage and transport of said frame assembly;

a pair of loop members extending from said cover member for providing handles to facilitate manipulation of said frame assembly when said cover member is coupled to said frame assembly, said loop members being positioned symmetrically with respect to an axis passing through a center of said cover member, said loop members being positioned proximate an outer edge of said cover member whereby said loop members are engageable to each other to form a single handle when said frame assembly is folded.

2. A solar pool heating system comprising:

a buoyant plastic frame assembly adapted to float on a water surface of a pool;

a vinyl cover member couplable to said frame assembly to extend along a top of said frame assembly in spaced relationship to the water surface, said cover member being constructed of a heat absorbent material for enhancing heat transfer to said pool;

said frame assembly including an outer perimeter and a pair of cross members extending through a central opening of said outer perimeter for supporting said cover member;

a medial portion of said frame assembly being flexible to permit folding of said frame assembly along a substantially straight line to facilitate storage and transport of said frame assembly;

said cover member being positioned to extend around said frame assembly when said frame assembly is in a folded position such that said cover member substantially envelopes said frame assembly;

a pair of loop members extending from said cover member for providing handles to facilitate manipulation of said frame assembly when said cover member is coupled to said frame assembly, said loop members being positioned symmetrically with respect to an axis passing through a center of said cover member, said loop members being positioned proximate an outer edge of said cover member whereby said loop members are engageable to each other to form a single handle when said frame assembly is folded; and wherein said frame assembly has an annular outer perimeter, a diameter of said outer perimeter being about 5 feet.

* * * * *